United States Patent
Matsuhira

(10) Patent No.: US 8,249,321 B2
(45) Date of Patent: Aug. 21, 2012

(54) IMAGE PROCESSING APPARATUS AND METHOD FOR RED EYE DETECTION

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 798 days.

(21) Appl. No.: 12/410,222

(22) Filed: Mar. 24, 2009

(65) Prior Publication Data

US 2009/0244614 A1   Oct. 1, 2009

(30) Foreign Application Priority Data

Mar. 26, 2008   (JP) .................................. 2008-079679

(51) Int. Cl.
*G06K 9/00* (2006.01)
*G06K 9/34* (2006.01)

(52) U.S. Cl. ...................................... 382/128; 382/167

(58) Field of Classification Search .................. 382/117, 382/128–132, 162, 164, 165, 167, 173, 241, 382/254, 255, 260, 274, 275; 348/222.1, 348/242, 246, 576, E13.059; 358/1.9, 1.15, 358/3.26, 452, 515, 518; 345/589, 591
See application file for complete search history.

(56) References Cited

U.S. PATENT DOCUMENTS

| | | | | | |
|---|---|---|---|---|---|
| 5,990,973 | A | * | 11/1999 | Sakamoto | 348/576 |
| 6,134,339 | A | * | 10/2000 | Luo | 382/115 |
| 6,885,766 | B2 | * | 4/2005 | Held et al. | 382/167 |
| 7,116,820 | B2 | * | 10/2006 | Luo et al. | 382/167 |
| 7,295,686 | B2 | * | 11/2007 | Wu | 382/117 |
| 7,627,146 | B2 | * | 12/2009 | Thakur | 382/117 |
| 7,646,510 | B2 | * | 1/2010 | Matsuhira | 358/1.9 |
| 7,961,353 | B2 | * | 6/2011 | Matsuhira | 358/1.9 |
| 7,995,804 | B2 | * | 8/2011 | Steinberg et al. | 382/117 |
| 2005/0062856 | A1 | * | 3/2005 | Matsushita | 348/222.1 |
| 2005/0094894 | A1 | * | 5/2005 | Yonaha | 382/275 |
| 2009/0244614 | A1 | * | 10/2009 | Matsuhira | 358/1.15 |
| 2012/0014600 | A1 | * | 1/2012 | Nanu et al. | 382/167 |

FOREIGN PATENT DOCUMENTS

JP   2004-318204   11/2004

* cited by examiner

*Primary Examiner* — Amir Alavi

(74) *Attorney, Agent, or Firm* — DLA Piper LLP (US)

(57) ABSTRACT

An image processing apparatus includes an organ detecting unit that detects an organ area including an image of an eye in a target image and a red-eye detecting unit that detects a red-eye area including an image of a red eye by using the organ area. The red-eye detecting unit detects the red-eye area in accordance with a first detection process from the organ area and detects the red-eye area in accordance with a second detection process that is different from the first detection process from a remaining area acquired by excluding the organ area from the target image.

6 Claims, 14 Drawing Sheets

IMAGE PROCESSING APPARATUS AND METHOD FOR RED EYE DETECTION

CROSS-REFERENCE TO RELATED APPLICATIONS

This application claims the benefit of priority under 35 USC 119 of Japanese application no. 2008-079679, filed on Mar. 26, 2008, which is incorporated herein by reference.

BACKGROUND

1. Technical Field

The present invention relates to an image processing apparatus, an image processing method, and a computer program for image processing.

2. Related Art

Generally, various types of image processing have been used. For example, there is a process for correcting colors and a process for deforming a subject. In addition, in order to perform image processing, technology for detecting a person's face from an image has been used. Related art is disclosed in JP-A-2004-318204.

There is a case where a person's eye (particularly, a pupil) included in an image is shown in red (a so-called red-eye). To detect the red-eye from an image is very useful for various processes (for example, red-eye correction) relating to the red-eye. However, sufficient consideration has not been made for detecting the red-eye in consideration of the type of subject that is represented by an image portion in which the red-eye is detected.

SUMMARY

The present invention provides technology capable of detecting a red-eye in consideration of the type of subject represented by an image portion in which the red-eye is detected. The invention can be implemented as the following forms or applied examples.

An image processing apparatus according to one aspect of the invention includes an organ detecting unit that detects an organ area including an image of an eye in a target image and a red-eye detecting unit that detects a red-eye area including an image of a red eye by using the organ area. The red-eye detecting unit detects the red-eye area in accordance with a first detection process from the organ area and detects the red-eye area in accordance with a second detection process that is different from the first detection process from a remaining area acquired by excluding the organ area from the target image.

According to this aspect, a red-eye area is detected in accordance with the first detection process from the organ area that includes an image of an eye, and a red-eye area is detected in accordance with the second detection process that is different from the first detection process from the remaining area acquired by excluding the organ area from the target image. Accordingly, a red eye is detected in consideration of the type of subject that is represented by an image portion in which the red eye is detected.

In one embodiment of the invention, the first detection process detects the red-eye area by using an image that represents the organ area and has relatively high pixel density, and the second detection process detects the red-eye area by using an image that represents the remaining area and has relatively low pixel density.

According to this embodiment, since an image having relatively high pixel density is used for detecting a red eye from the organ area, the accuracy of detection of the red eye is improved. In addition, since an image having relatively low pixel density is used for detecting a red eye from the area outside the organ area, the size of the memory needed for processing is reduced. In addition, the process for detecting a red eye is switched for an area inside the organ area and an area outside the organ area. Accordingly, the red eye is detected in consideration of the type of a subject that is represented by the image portion in which the red eye is detected.

In another embodiment of the invention, the first detection process detects an area satisfying a first condition as the red-eye area, and the second detection process detects an area satisfying a second condition, which is more difficult to satisfy than the first condition, as the red-eye area.

According to this embodiment, since an area that satisfies the first condition that is relatively mild is detected as a red-eye area from the organ area, a detection miss of a red-eye area is suppressed. In addition, an area that satisfies the second condition that is relatively strict is detected as a red-eye area from an area outside the organ area. Accordingly, erroneous detection of an area representing a subject other than a red eye as a red-eye area is suppressed. In addition, the process for detecting a red eye is switched for an area inside the organ area and an area outside the organ area. Accordingly, the red eye is detected in consideration of the type of a subject that is represented by the image portion in which the red eye is detected.

According to another embodiment of the invention, the first condition includes that pixels representing a pupil within an area to be detected as the red-eye area include a pixel that represents a color in a first red-color range, and the second condition includes that the pixels representing the pupil include a pixel that represents a color in the first red-color range and represents a color in a second red-color range that is narrower than the first red-color range.

According to this embodiment, since a first red-color range that is relatively broad is used for detection of a red eye from an area inside the organ area, a detection miss of a red-eye area is suppressed. In addition, since a second red-color range that is relatively narrow is used for detection of a red eye from an area outside the organ area, erroneous detection of an area representing a subject other than a red eye as a red-eye area is suppressed. In addition, the process for detecting a red eye is switched for an area inside the organ area and an area outside the organ area. Accordingly, the red eye is detected in consideration of the type of a subject that is represented by the image portion in which the red eye is detected.

In another embodiment, the first condition includes that a similarity between a candidate area including an area to be detected as the red-eye area and a predetermined reference image representing a red eye is higher than a first threshold value, and the second condition includes that the similarity is higher than a second threshold value that is larger than the first threshold value.

According to this embodiment, since a first threshold value that is relatively small is used for detection of a red eye from an area inside the organ area, a detection miss of a red-eye area is suppressed. In addition, since a second threshold value that is relatively large is used for detection of a red eye from an area outside the organ area, erroneous detection of an area representing a subject other than a red eye as a red-eye area is suppressed. In addition, the process for detecting a red eye is switched for an area inside the organ area and an area outside the organ area. Accordingly, the red eye is detected in consideration of the type of a subject that is represented by the image portion in which the red eye is detected.

An image processing apparatus according to another embodiment of the invention further includes an image processing unit that performs red-eye correction by using the detected red-eye area.

According to this embodiment, in the form of performing red-eye correction, the red eye is detected in consideration of the type of subject that is represented by the image portion in which the red eye is detected.

Another aspect of the invention is a printer including: an organ detecting unit that detects an organ area including an image of an eye in a target image; a red-eye detecting unit that detects a red-eye area including an image of a red eye by using the organ area; an image processing unit that performs red-eye correction by using the detected red-eye area; and a printing unit that prints the target image processed by the image processing unit. The red-eye detecting unit detects the red-eye area in accordance with a first detection process from the organ area and detects the red-eye area in accordance with a second detection process that is different from the first detection process from a remaining area acquired by excluding the organ area from the target image.

Another aspect of the invention is an image processing method including: detecting an organ area including an image of an eye in a target image and detecting a red-eye area including an image of a red eye by using the organ area. The red-eye area is detected in accordance with a first detection process from the organ area and in accordance with a second detection process that is different from the first detection process from a remaining area acquired by excluding the organ area from the target image, Another aspect of the invention is a computer program for image processing. The computer program is embodied in a computer-readable medium and causes a computer to implement: an organ detecting function for detecting an organ area including an image of an eye in a target image and a red-eye detecting function for detecting a red-eye area including an image of a red eye by using the organ area. The red-eye detecting function includes: a function for detecting the red-eye area in accordance with a first detection process from the organ area and a function for detecting the red-eye area in accordance with a second detection process that is different from the first detection process from a remaining area acquired by excluding the organ area from the target image.

The invention can be implemented in various forms including an image processing method, an image processing apparatus, a computer program for implementing functions of the method or the apparatus, a recording medium having the computer program stored thereon, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
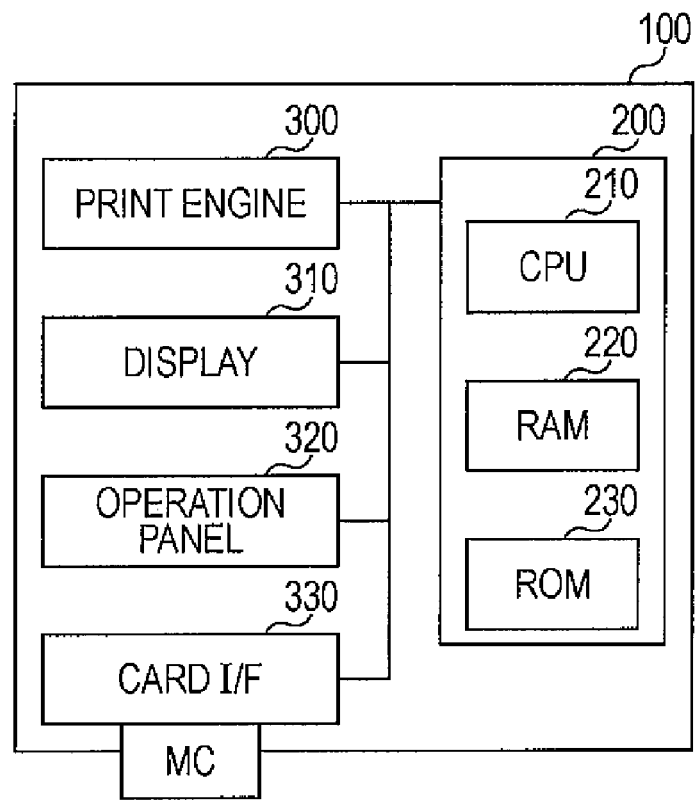
FIG. 1 is a block diagram of a printer according to an embodiment of the invention.

Embodiments of the invention are now described in the following order.
A. First Embodiment
B. Second Embodiment
C. Third Embodiment
D. Fourth Embodiment
E. Modified Examples First Embodiment FIG. 1 is a block diagram of a printer 100 according to an embodiment of the invention. Printer 100 includes a control unit 200, a print engine 300, a display 310, an operation panel 320, and a card interface (I/F) 330.

The control unit 200 is a computer that includes a CPU 210, a RAM 220, and a ROM 230. Control unit 200 controls constituent elements of the printer 100.

The print engine 300 is a printing mechanism that performs a printing operation by using supplied print data. Various printing mechanisms may be employed, such as a printing mechanism that forms an image by discharging ink droplets onto a printing medium, and a printing mechanism that forms an image by transferring and fixing toner on a printing medium.

The display 310 displays various types of information including an operation menu and an image in accordance with an instruction transmitted from the control unit 200. Various displays such as a liquid crystal display and an organic EL display may be employed as display 310.

The operation panel 320 receives a direction from a user and may include, for example, operation buttons, a dial, or a touch panel.

The card I/F 330 is an interface of a memory card MC. The control unit 200 reads out an image file that is stored in the memory card MC through the card I/F 330. Then, the control unit 200 performs a printing process by using the read-out image file.

Figure 2:
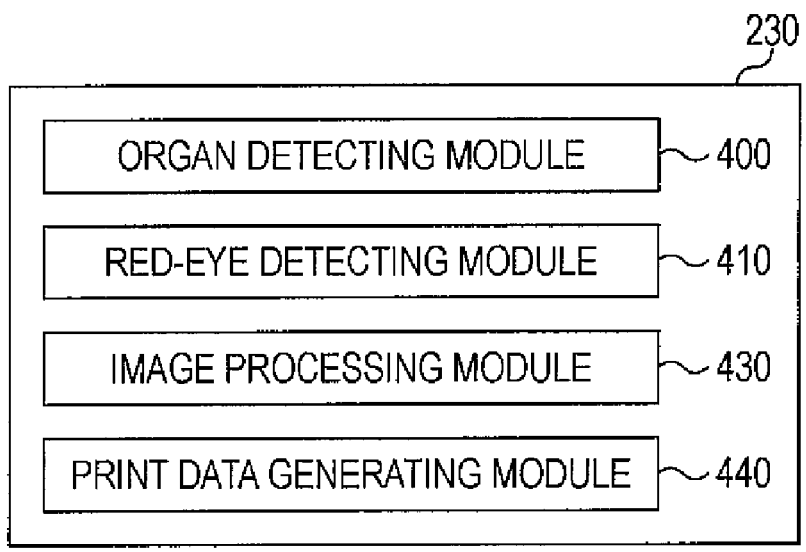
FIG. 2 is a block diagram showing modules that are loaded into the ROM of the printer of FIG. 1.

FIG. 2 is a block diagram showing modules that are loaded into the ROM 230 (FIG. 1). According to this embodiment, an organ detecting module 400, a red-eye detecting module 410, an image processing module 430, and a printing data generating module 440 are stored in the ROM 230. Modules 400-

440 are programs that are executed by the CPU 210. Hereinafter, "the CPU performs a process in accordance with a module" is simply represented as "a module performs a process". The modules 400-440 can transmit or receive data to or from one another through the RAM 220. The functions of the modules 400-440 are described later in detail.

Figure 3:
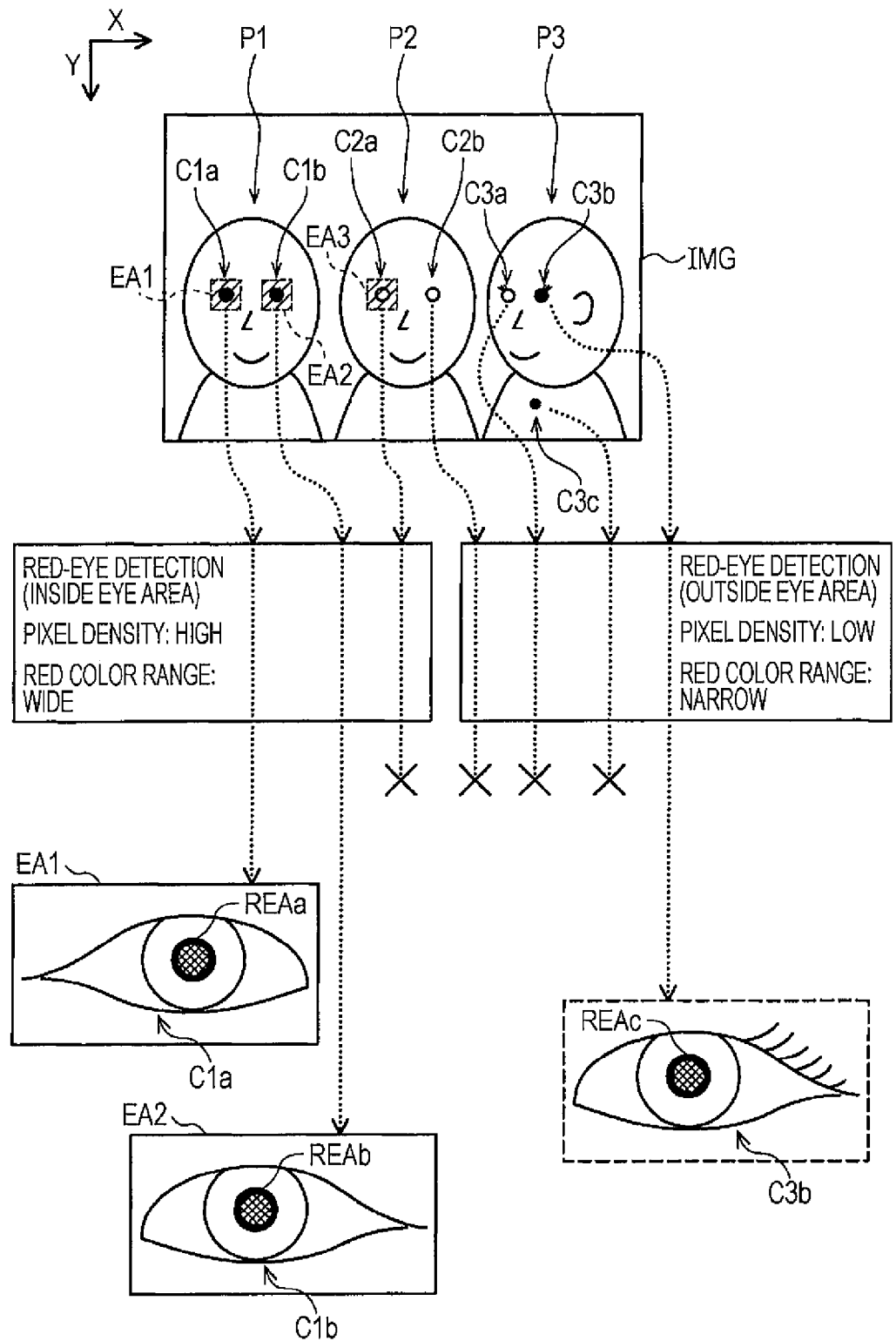
FIG. 3 is a schematic diagram of a red-eye detecting process according to a first embodiment of the invention.

FIG. 3 is a schematic diagram of a red-eye detecting process according to a first embodiment of the invention. In this embodiment, the control unit 200 (FIG. 1) performs a red-eye correcting operation for printing an image. The control unit 200 detects a red-eye area for performing this red-eye correcting operation. In FIG. 3, three persons P1, P2, and P3 are shown in a target image IMG to be processed. Eyes C1a and C1b represent the eyes of a first person P1, eyes C2a and C2b represent the eyes of a second person P2, and eyes C3a and C3b represent the eyes of a third person P3. Among these eyes, three eyes C1a, C1b, and C3b are shown in red (red-eye). In addition, a button C3c is shown in the target image IMG. Button C3c is in a red color that is similar to that of the red-eye.

In this embodiment, first, the organ detecting module 400 (FIG. 2) detects an eye area that is included in the target image IMG. The eye area is an area that includes an image of a person's eye. Various known methods, such as a pattern matching method using a template image of an eye, can be used to detect the eye area. The organ detecting module 400 detects an eye area regardless of whether the eye (pupil) is shown in red. For example, the organ detecting module 400 may perform a detection operation (for example, a pattern matching operation) for an eye area, with the pupil area excluded.

In the example of FIG. 3, an eye area EA1 representing the eye C1a, an eye area EA2 representing the eye C1b, and an eye area EA3 representing the eye C2a are detected. The detected eye areas EA1, EA2, and EA3 are hatched. Thus, eye areas representing the other eyes C2b, C3a, and C3b are not detected. A detection error of this type may be generated for various reasons. For example, a subject (in particular, an eye) may be shown blurred.

Next, the red-eye detecting module 410 (FIG. 2) detects a red-eye area that is included in the target image IMG. When a pupil area of the eye is shown in red, the red-eye detecting module 410 detects the red portion as a red-eye area. Various known methods, such as a pattern matching method using a template image of a red eye, may be used to detect the red eye area. The red-eye detecting process differs for an area within the eye area and an area out of the eye area.

For the eye area, the red-eye detecting module 410 uses the target image IMG without changing the pixel density thereof. In addition, the red-eye detecting module 410 uses a relatively broad range of red colors as a range of colors to be represented by a pixel representing a pupil. In other words, as the red-eye area, an area that represents a wide range of red colors can be detected. As described above, since the red-eye area is detected under a mild condition, detection errors can be suppressed. A detailed process thereof is described later.

In FIG. 3, the result of detection of red-eye areas from the eye areas EA1, EA2, and EA3 is shown. A red portion of the eye C1a (the eye area EA1) is detected as the red-eye area REAa, and a red portion of the eye C1b (the eye area EA2) is detected as the red-eye area REAb. Since the color of a pupil area of the eye C2a (the eye area EA3) is not red, a red-eye area is not detected in the eye C2a.

Outside the eye area, the red-eye detecting module 410 generates a reduced-size image having low pixel density from the target image IMG and detects a red-eye area by using the reduced-size image. The red-eye detecting module 410 uses a relatively narrow area of a red color as the range of colors to be represented by a pixel that represents a pupil. In other words, an area that represents a red color of a narrow range is detected as the red-eye area. Since the red-eye area is detected under a strict condition, detection of a red subject that is not a red-eye as a red-eye is suppressed. A detailed process thereof is described later.

In FIG. 3, the result of detection of the red-eye area from an area outside the eye area is represented. A red portion of the eye C3b is detected as a red-eye area REAc. Since the colors of pupil areas of two eyes C2b and C3a are not red, no red-eye area is detected from the eyes C2b and C3a. In addition, because the color of the button C3c is a red color out of the range of the narrow red color, the button C3c is not detected as a red-eye.

Figure 4:
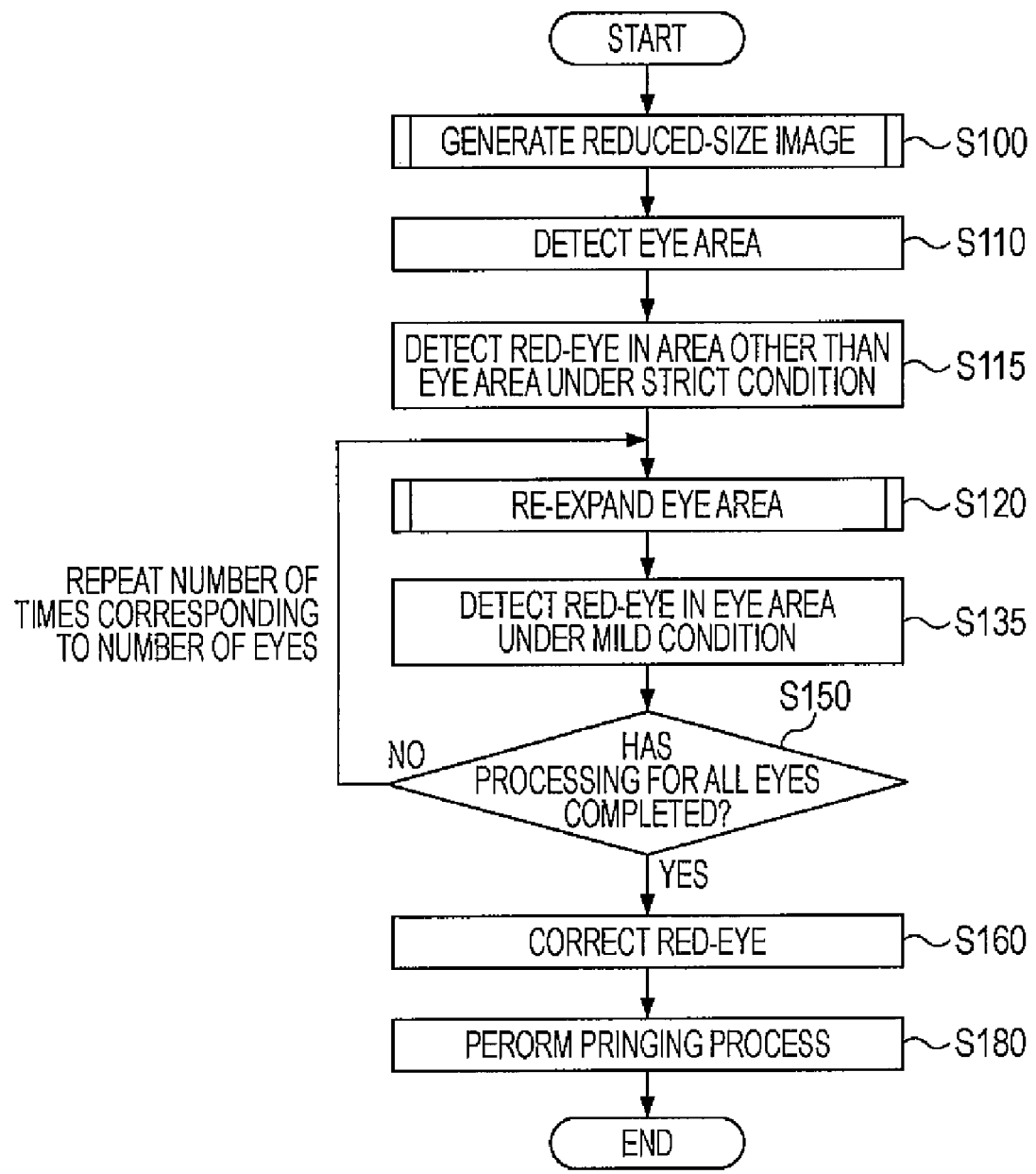
FIG. 4 is a flowchart of a printing process according to an embodiment of the invention.

FIG. 4 is a flowchart of a printing process. The image processing module 430 starts this printing process in response to a user's direction that is input to the operation panel 320 (FIG. 1). In this printing process, the control unit 200 prints an image represented by image data that is included in an image file designated by the user's direction. Hereinafter, an image file designated by a user is referred to as a "target image file", and image data that is stored in the target image file is referred to as "target image data". In addition, an image represented by the target image data is also referred to as a "target image".

In the first Step S100, the organ detecting module 400 (FIG. 2) generates a reduced-size image of low pixel density that represents a same image as the target image by using the target image data.

Figure 5:
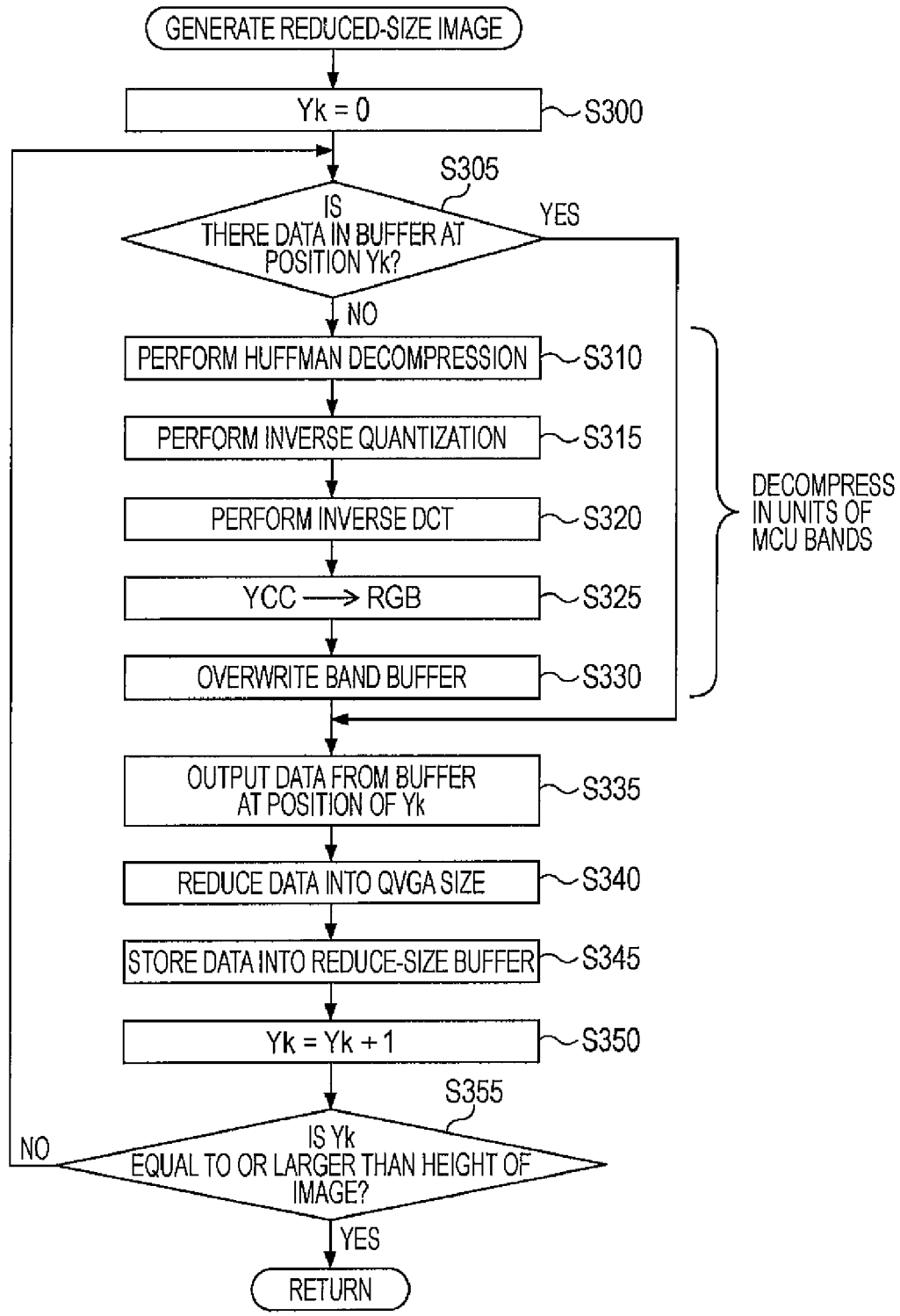
FIG. 5 is a flowchart of a reduced-size image generating operation according to an embodiment of the invention.

FIG. 5 is a flowchart of a reduced-size image generating operation. In this embodiment, the organ detecting module 400 generates an image of a so-called QVGA size (320×240 pixels) as the reduced-size image.

Figure 6:
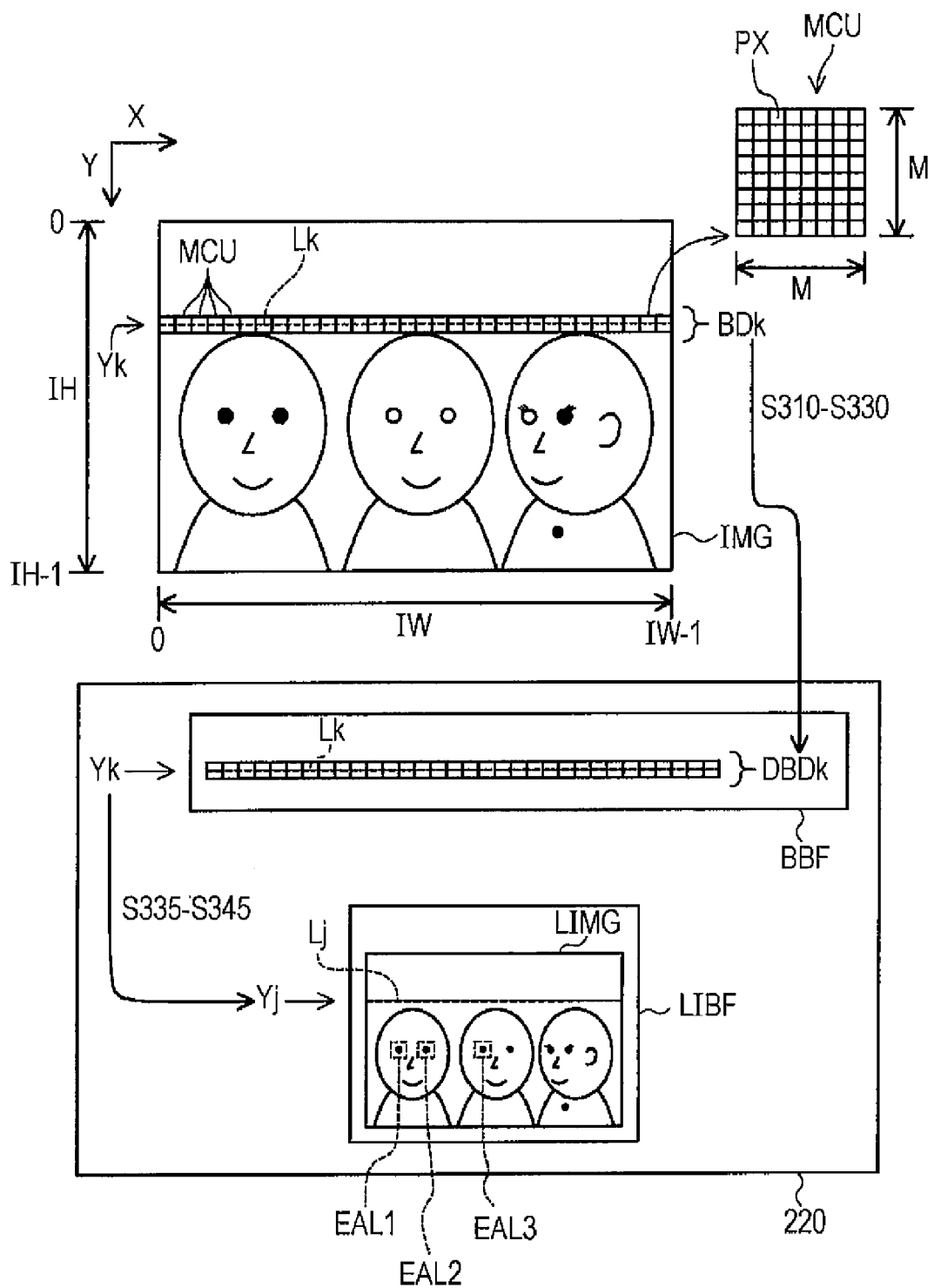
FIG. 6 is a schematic diagram of a reduced-size image generating operation according to an embodiment of the invention.

FIG. 6 is a schematic diagram of a reduced-size image generating operation. The shape of the target image IMG is rectangular, and a plurality of pixels is disposed to be aligned in directions X and Y that are perpendicular to each other. A total number of pixels in direction X is IW, and a total number of pixels in direction Y is IH. The position of a pixel in direction X is within the range of "0" to "IW−1", and the position of a pixel in direction Y is within the range of "0" to "IH−1".

Here, it is assumed that the width IW is larger than "320" and the height "IH" is larger than "240". In addition, data representing the target image IMG is so-called JPEG image data. As is well known, in the JPEG image data, data is encoded (for example, various types of data compression) for each pixel block that is referred to as an MCU (Minimum Coded Unit). Hereinafter, this block is referred to as a "block MCU". In the target image IMG of FIG. 6, a part of the block MCU is shown. In addition, in an upper right part of FIG. 6, an enlarged view of the block MCU is shown. In this embodiment, the block MCU is a block that is configured by a plurality of pixels PX of M×M (here, M is an integer that is equal to or larger than one). Generally, as a block size M, "8" is used.

The organ detecting module 400 generates the reduced-size image by using a pixel line that extends in direction X. In FIG. 6, a pixel line Lk of which a position in direction Y is Yk is denoted by a broken line. A block band BDk represents a block MCU that includes pixels representing this pixel line. The block band BDk is one line of a block that extends in direction X.

In the first Step S300 of FIG. 5, the organ detecting module 400 initializes the position Yk of the target line Lk in direction Y (Yk=0). In the next Step S305, it is determined whether decoded data representing the target line Lk is stored in a band buffer BBF inside the RAM 220. An area at a predetermined address inside the RAM 220 is used as the band buffer BBF. When decoding is not completed, the organ detecting module 400 decodes each block MCU of the block band BDk (using, for example, various types of data extraction) and stores the decoded data (decoded block band DBDk) in the band buffer BBF. Here, processes including Huffman decompression (S310), inverse quantization (S315), inverse DCT (inverse discrete cosine transformation: S320), and color conversion (S325) from a YCC color space into an RGB color space are performed. Old data stored in the band buffer BBF is then overwritten by new data (S330).

When decoding of the block band BDk is completed, the organ detecting module 400 skips Steps S310 to S330 and proceeds to Step S335.

In Step S335, the organ detecting module 400 acquires the pixel data that represents the target line Lk (the position in direction Y=Yk) from the band buffer BBF. Then, in the next Step S340, the organ detecting module 400 calculates pixel data of a part of pixel lines of the reduced-size image LIMG by using the pixel data of the target line Lk. In FIG. 6, the pixel data of a pixel line Lj of which a position in direction Y=Yj is calculated. In the next Step S345, the organ detecting module 400 stores the calculated pixel data in a reduced-size image buffer LIBF inside the RAM 220. An area at a predetermined address inside the RAM 220 is used as the reduced size image buffer LIBF. Various methods of calculating the pixel data of the reduced-size image LIMG may be used. For example, by simply thinning out a part of pixels, the remaining pixels may be used as pixels of the reduced-size image LIMG. In addition, by interpolation (for example, linear interpolation), the pixel data of the reduced-size image LIMG may be calculated.

The organ detecting module 400 then increases the position Yk by one (S350) and determines whether the position Yk is equal to or larger than the height IH (S355). Then, the organ detecting module 400 repeatedly performs the processes of S305-S355 with each of all the pixel lines of the target image IMG focused. As a result, the reduced-size image LIMG is stored in the reduced-size image buffer LIBF. Then, the reduced-size image generating process is completed.

In the next Step S110 of FIG. 4, the organ detecting module 400 analyzes the reduced-size image LIMG and detects an eye area. The detected eye area is an area in the reduced-size image LIMG and includes an eye image. In this step, an eye area is detected regardless of whether the eye is a red-eye.

In FIG. 6, the result of detection of the eye areas is shown. The reduced-size image LIMG (that is, the target image IMG) represents three persons. The organ detecting module 400 detects three eye areas EAL1, EAL2, and EAL3. As shown in FIG. 6, according to this embodiment, a rectangular area including one eye image is detected as the eye area. Although not shown in FIG. 6, when the size of an eye in the reduced-size image LIMG is small, a small eye area is detected. On the other hand, when the size of an eye is large in the reduced-size image LIMG, a large eye area is detected. In addition, the aspect ratio (the ratio of horizontal size to the vertical size) of the eye area may be changed in accordance with the shape of an eye in the target image. Alternatively, the aspect ratio may be fixed.

Various known methods of detecting an eye area using the organ detecting module 400 may be used. According to this embodiment, an eye area is detected by performing pattern matching using a template image of an eye. Various methods of pattern matching using a template may be used (for example, see JP-A-2004-318204).

In addition, the organ detecting module 400 determines an eye area in the target image IMG that represents a same portion as the eye area detected from the reduced-size image LIMG, in accordance with a relative position in the reduced-size image LIMG. As a result, the organ detecting module 400 detects an eye area in the target image IMG. According to this embodiment, since the reduced-size image LIMG is used for detecting the eye area, the process can be performed at a high speed.

Figure 7:
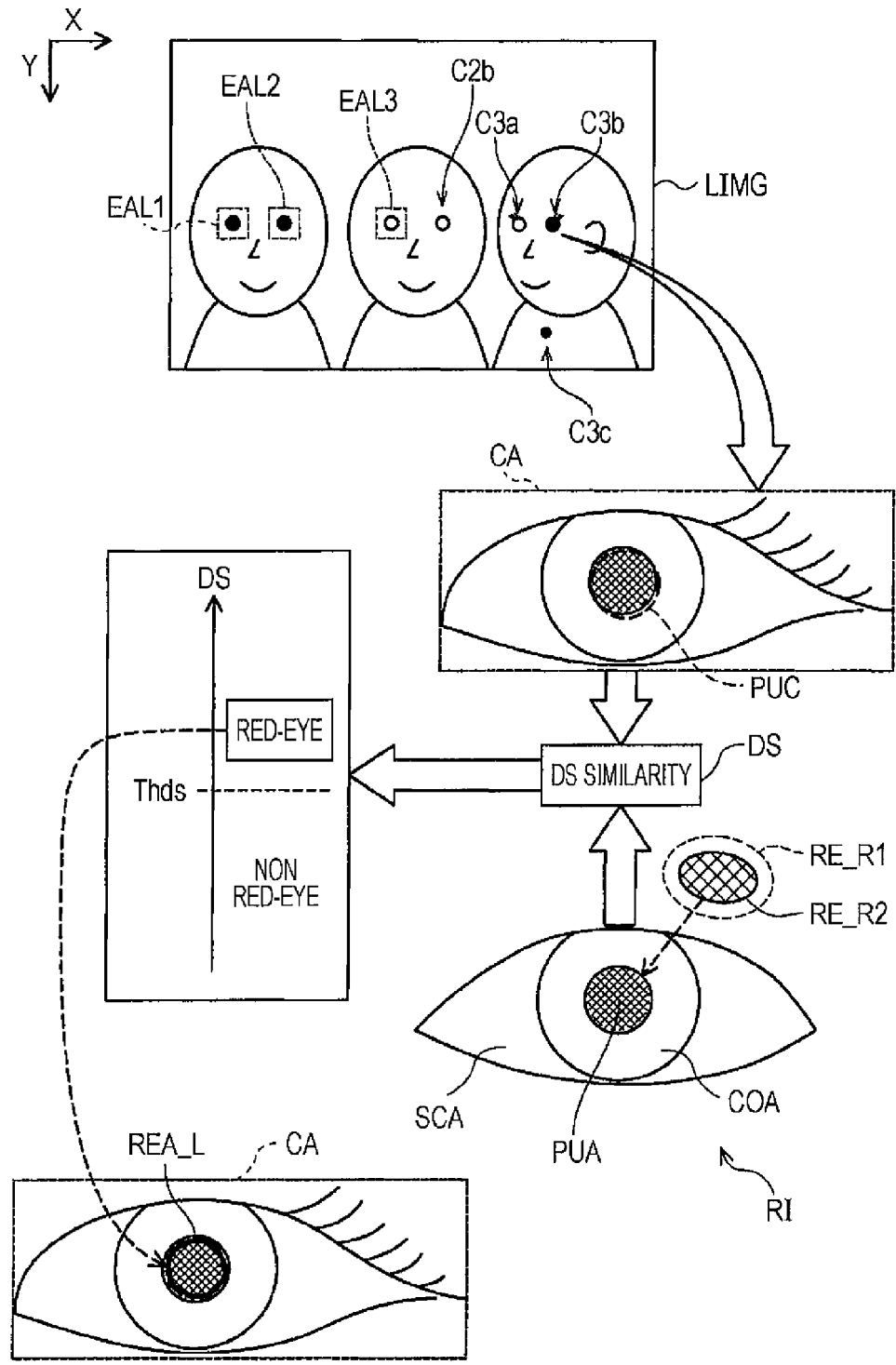
FIG. 7 is a schematic diagram showing a red-eye area detecting process using a reduced-size image LIMG according to an embodiment of the invention.

In the next Step S115 of FIG. 4, the red-eye detecting module 410 detects a red-eye area from an area outside the eye area by using the reduced-size image LIMG. FIG. 7 is a schematic diagram showing a red-eye area detecting process using the reduced-size image LIMG. The red-eye detecting module 410 detects a red-eye area by performing pattern matching using a predetermined reference image RI that represents a red-eye. The reference image RI includes a white-eye area SCA (an area that represents a sclera), a black-eye area COA (an area that represents a cornea), and a pupil area PUA (an area that represents a pupil). According to this embodiment, the color of the white-eye area SCA is set to be close to a white color, the color of the black-eye area COA is set to be close to a black color, and the color of the pupil area PUA is set as a red color. The colors of each area are preferably determined experimentally in advance. The reference image RI is represented by a predetermined plurality of pixels that is disposed in a matrix shape. Gray scale values of three color components R (red), G (green), and B (blue) are assigned to each pixel. The shape of the reference image RI may or may not be a rectangle.

The red-eye detecting module 410 calculates the similarity DS between a partial area (hereinafter, referred to as a candidate area CA) of the reduced-size image LIMG and the reference image RI. Any arbitrary value that represents the degree of similarity between two images can be used as the similarity DS.

The values described below, for example, may be used as the similarity. First, the red-eye detecting module 410 determines the relative position relationship between the candidate area CA and the reference image RI for a case where it is assumed that the reference image RI is superposed on the candidate area CA. The red-eye detecting module 410 then calculates a difference between pixel values of images CA and RI for each position of pixels of the reference image RI. Since the pixel value is represented by gray scale values of three color components R, G, and B, differences of gray scale values of three color components are calculated. Next, the red-eye detecting module 410 calculates a sum of the differences of the pixel values for all the color components and all the positions of pixels within the reference image RI. Next, the red-eye detecting module 410 calculates a difference of the sum value by subtracting the sum value from a maximum value that can be taken by the sum value. Then, the red-eye detecting module 410 calculates the similarity DS by dividing the difference of the sum value by the total number of the pixels that is used for calculating the sum value. By performing a division operation using the total number of pixels, a similarity DS that is not dependent upon the pixel density for calculation of the similarity is calculated (here, the pixel density for calculation of the similarity corresponds to the total number of pixels within the reference image RI which are used in calculating the similarity DS). When the candidate area CA and the reference image RI are the same, the difference of the pixel value for each pixel position is zero. Accordingly, the similarity DS becomes the maximum value that can be taken. As the difference of the pixel value increases, the similarity DS decreases.

Figure 8:
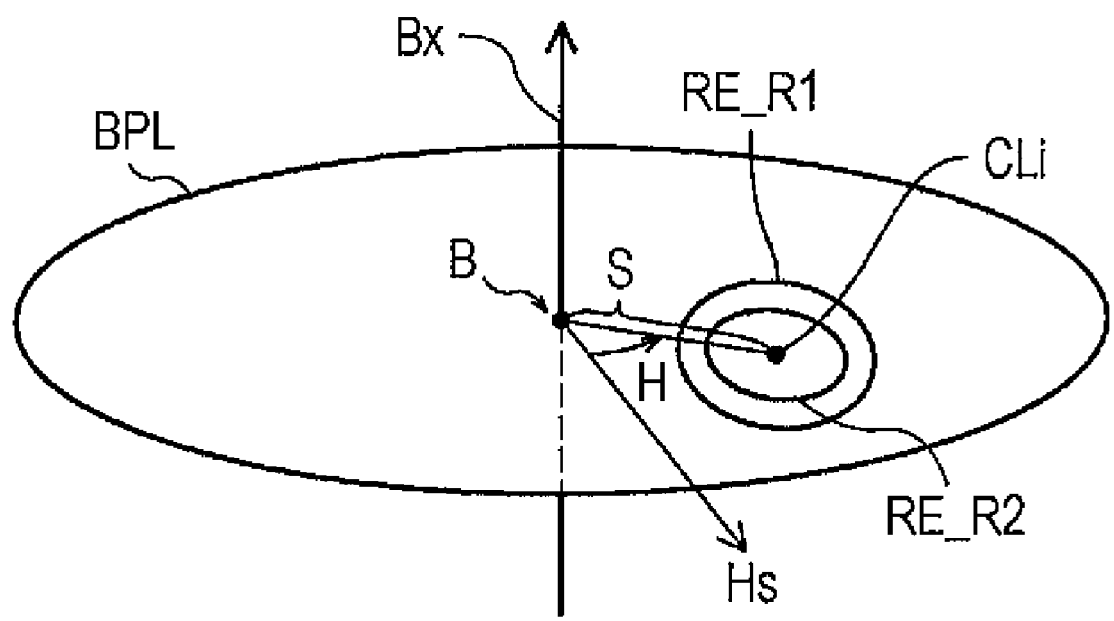
FIG. 8 is a schematic diagram showing the range of a red color according to an embodiment of the invention.

FIG. 8 is a schematic diagram showing the range of a red color. According to this embodiment, a preferred color range (the range of the red color) of the pupil area PUA of the reference image RI (FIG. 7) is set in advance. FIG. 8 shows an HSB color space (hue H, saturation S, and brightness B). A color that is represented by the image data is represented as a specific point within this color space. In FIG. 8, a point CLi that represents one color is shown. A position in the direction of a vertical axis Bx represents the brightness B. A distance between the vertical axis Bx and the point CLi represents saturation S. In a plane BPL of which brightness is the same as that of the point CLi, an angle between a predetermined direction Hs viewed from the vertical axis Bx and a direction from the vertical axis Bx toward the point CLi represents hue H. This angle represents a counterclockwise angle viewed from a higher side of the brightness B toward a lower side thereof.

The point CLi shown in FIG. 8 represents a typical red color of the red-eye. Two red-color ranges RE_R1 and RE_R2 including point CLi are set in advance. The first red-color range RE_R1 includes a second red-color range RE_R2 and is broader than the second red-color range RE_R2. Ranges RE_R1 and RE_R2 are a part of the entire range of the color range. Within ranges RE_R1 and RE_R2, the hue H, saturation S, and brightness B can be changed. However, some of the hue H, saturation S, and brightness B may be fixed. Ranges RE_R1 and RE_R2 are preferably experimentally set in advance.

In Step S115 of FIG. 4, a second red-color range RE_R2 that is relatively narrow is used. When the color of a pixel included in an area (hereinafter, referred to as a pupil candidate area PUC) of the candidate area CA (FIG. 7) that is overlapped with the pupil area PUA is within the second red-color range RE_R2 that is relatively narrow, the red-eye detecting module 410 sets the similarity to be high. On the other hand, when the color of a pixel of the pupil candidate area PUC is out of the second red-color range RE_R2, the red-eye detecting module 410 sets the similarity to be low. Various methods of setting the similarity in accordance with the second red-color range RE_R2 as described above may be used. For example, when the color of a pixel position located in the pupil candidate area PUC is within the second red-color range RE_R2, a difference of the pixel value at the pixel position may be set to be zero. In addition, when the color of a pixel position is out of the second red-color range RE_R2, a difference between the pixel value at the pixel position and the pixel value representing the typical color CLi may be used as a difference of the pixel value.

Next, the red-eye detecting module 410 compares the similarity DS with a similarity threshold value Thds. When the similarity DS is larger than the similarity threshold value Thds, the red-eye detecting module 410 determines that the candidate area CA represents a red-eye. On the other hand, when the similarity DS is equal to or smaller than the similarity threshold value Thds, the red-eye detecting module 410 determines that the candidate area CA does not represent a red-eye. As a result, when pixels within the pupil candidate area PUC include a pixel representing the color within the second red-color range RE_R2, it is determined that the candidate area CA represents a red-eye. The similarity threshold value Thds is preferably experimentally determined in advance such that an eye not shown in red is not detected as a red-eye.

When determining that the candidate area CA represents a red-eye, the red-eye detecting module 410 determines a red-eye area REA_L that represents the red-eye from the candidate area CA. Various methods of determining the red-eye area REA_L may be used. For example, a red-color pixel that represents a color within the second red-color range RE_R2 may be selected from the candidate area CA as a pixel of the red-eye area REA_L. In addition, an area connecting a plurality of red-color pixels may be selected as a red-eye area REA_L. Here, the color of the red-color pixel may be a color within a predetermined range of a red color other than the second red color range RE_R2. In addition, the red-eye area may be selected from the inside of the pupil candidate area PUC. In any case, the red-eye detecting module 410 determines a red-eye area of the target image IMG from the determined red-eye area REA_L. The red-eye area of the target image IMG represents a same part as the red-eye area REA_L of the reduced-size image LIMG.

In addition, the red-eye detecting module 410 detects red-eye areas at various positions inside the reduced-size image LIMG by moving the candidate area CA within the reduced-size image LIMG. The red-eye detecting module 410 also detects red-eye areas from eyes of various sizes by increasing or reducing the size of the reference image RI in the reduced-size image LIMG. In addition, there is a case where the pixel position of the candidate area CA is not overlapped with the pixel position of the reference image RI. In such a case, the red-eye detecting module 410 preferably calculates a pixel value in the candidate area CA by interpolation for calculating the similarity DS. To the contrary, a difference of gray scale values in each pixel position of the candidate area CA may be used for calculating the similarity DS.

As described above, the red-eye detecting module 410 (FIG. 2) detects a red eye area from an area located outside the eye area by using the reduced-size image LIMG.

Figure 9A:
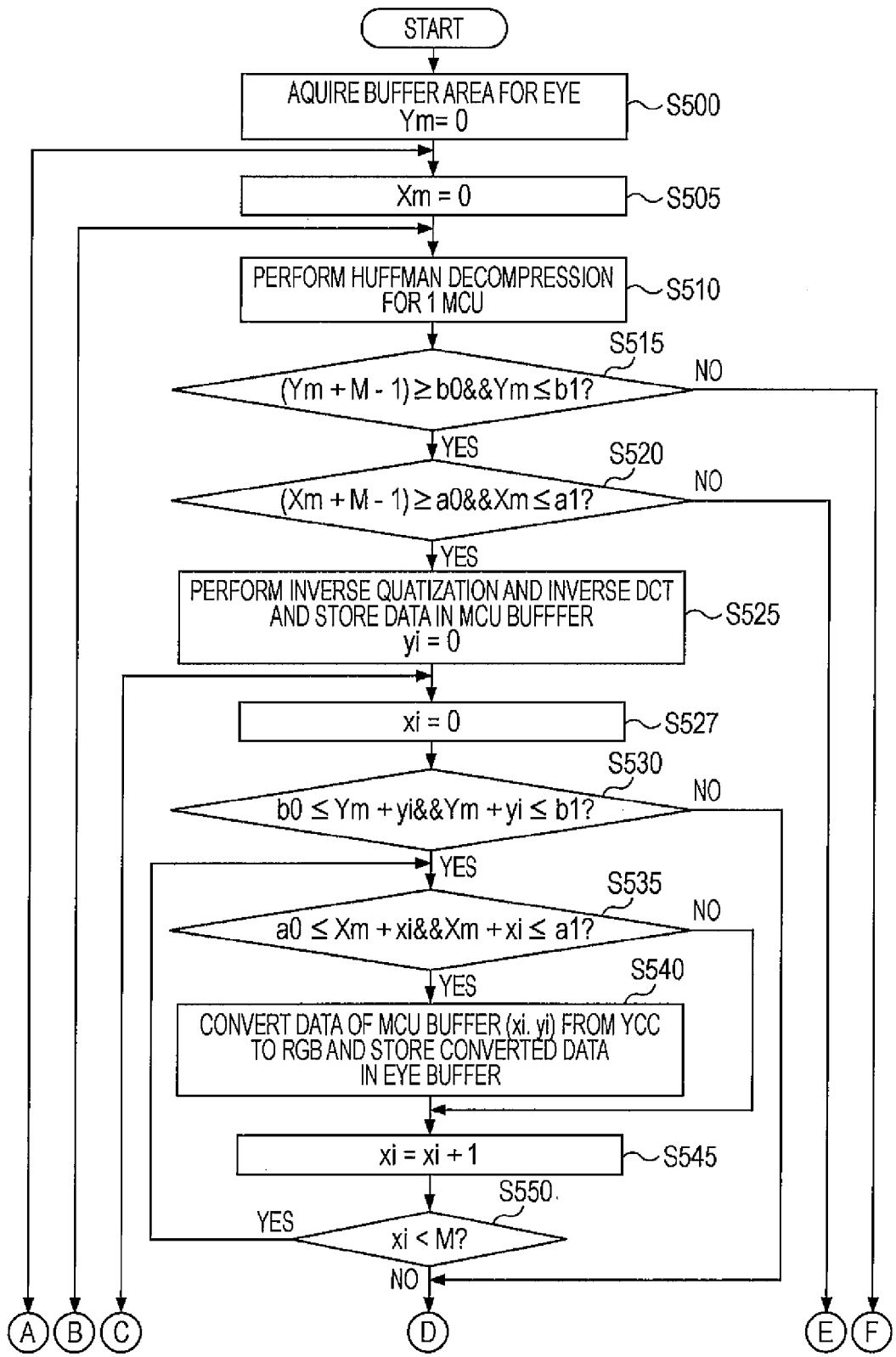
FIGS. 9A and 9B are flowcharts showing the sequence for decoding an eye area according to an embodiment of the invention.
Figure 9B:
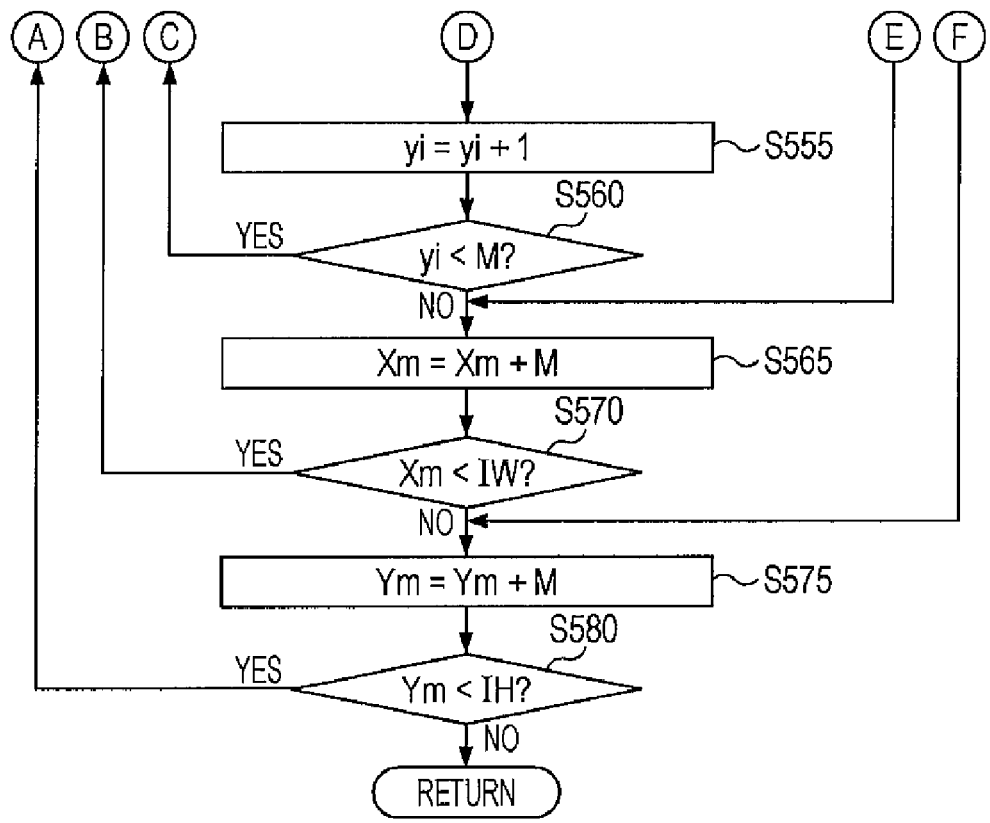

In the next Step S120 of FIG. 4, the red-eye detecting module 410 decodes (expands) the eye area. FIGS. 9A and 9B are flowcharts showing the sequence for decoding the eye area. The red-eye detecting module 410 acquires image data of the eye area by selectively decoding the block MCU, which includes a pixel representing the eye area, among the plurality of bock MCUs that is included in the target image IMG in accordance with the flowchart.

Figure 10:
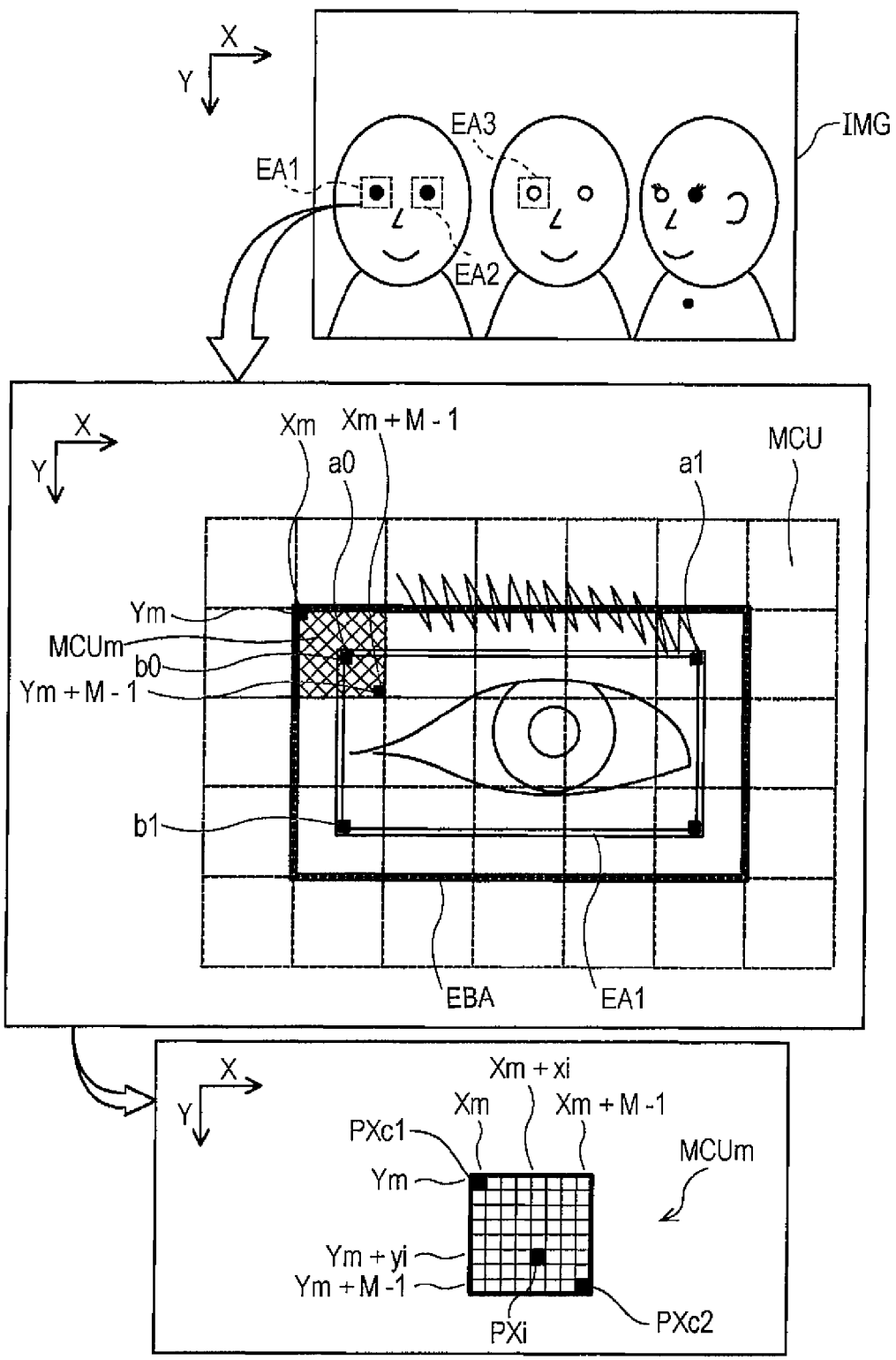
FIG. 10 is a schematic diagram showing a decoding process for an eye area according to an embodiment of the invention.

FIG. 10 is a schematic diagram showing a decoding process for the eye area. In an upper part of FIG. 10, a target image IMG and three eye areas EA1, EA2, and EA3 are shown These eye areas EA1, EA2, and EA3 are areas that are detected by the organ detecting module 400 and represent same portions as the eye areas EAL1, EAL2, and EAL3 of FIG. 6.

In the middle portion of FIG. 10, an enlarged view of the peripheral portion of the first eye area EA1 is shown. Hereinafter, an example of a case where the image data representing the first eye area EA1 is acquired is described. The first eye area EA1 extends over a plurality of block MCUs. The eye block area EBA shown in FIG. 10 is an area that is configured by a block MCU including the pixel representing the first eye area EA1. The red-eye detecting module 410 acquires the image data representing the first eye area EA1 by selectively decoding the block MCU within the eye block area EBA without decoding the block MCU other than the eye block area EBA. Here, The red-eye detecting module 410 determines whether one block MCU (referred to as a target block MCUm) within the target image IMG includes a pixel of the eye area and decodes the target block MCUm for a case where the target block MCUm includes the pixel of the eye area. This determination process is performed for all block MCUs.

In addition, in the embodiment shown in FIG. 10, the first eye area EA1 is a rectangular area of which a position in direction X is a0 to a1 (a0<a1) and of which a position in direction Y is b0 to b1 (b0<b1). The target block MCUm can be determined by the position (X=Xm and Y=Ym) of a pixel located in the corner closest to the pixel (X=0, and Y=0) at the origin point.

In the first Step S500 of FIG. 9, the red-eye detecting module 410 acquires a buffer area for the image data, which represents the eye area EA1, in the RAM 220 (FIG. 1). The size of this buffer area is determined based on the number of the pixels of the eye area EA1. In addition, the red-eye detecting module 410 initializes the position Ym of the target block MCUm in direction Y (Ym=0). In the next Step S505, the position Xm of the target block MCUm in direction X is initialized (Xm=0). In the next Step S510, Huffman decompression is performed for the target block MCUm.

In the next Steps S515 and S520, the red-eye detecting module 410 determines whether the target block MCUm includes a pixel of the eye area EA1. In a lower portion of FIG. 10, an enlarged view of the target block MCUm is shown. A first corner pixel PXc1 represents a pixel (X=Xm and Y=Ym) of a corner that is the closest to the pixel (X=0 and Y=0) of the origin point. A second corner pixel PXc2 represents a pixel (X=Xm+M−1 and Y=Ym+M−1) of a corner that is the farthest from the pixel of the origin point. Here, when at least one between two corner pixels PXc1 and PXc2 is within the first eye area EA1, it can be determined that the target block MCUm includes the pixel of the eye area EA1.

In Step S515, it is determined whether the following Condition B1 is satisfied.
Condition B1
"Ym+M−1" is equal to or larger than b0, and Ym is equal to or smaller than b1.

In the next Step S520, it is determined whether the following Condition B2 is satisfied.
Condition B2: "Xm+M−1" is equal to or larger than a0, and Xm is equal to or smaller than a1.

Condition B1 represents that at least one between the positions of two corner pixels PXc1 and PXc1 in direction Y is located within the first eye area EA1. Condition B2 represents that at least one between the positions of two corner pixels Pxc1 and Pxc1 in direction X is located within the first eye area EA1. When both Conditions B1 and B2 are satisfied, the target block MCUm includes a pixel of the eye area EA1.

When both Conditions B1 and B2 are satisfied, the red-eye detecting module 410 decodes the target block MCUm in Step S525. This decoding process is the same as that of Steps S315 and S320 of FIG. 4. The red-eye detecting module 410 stores the image data acquired from the decoding process in a buffer that is used for the block MCU of the RAM 220.

Subsequently, the red-eye detecting module 410 performs the process with one pixel (a target pixel PXi), which is located within the target block MCUm, focused (a lower portion of FIG. 10). Here, in Step S525, the red-eye detecting module 410 initializes a relative position (yi) of the target pixel PXi (FIG. 10) in direction Y (yi=0). In the next Step S527, a relative position (xi) in direction X is initialized (xi=0). These relative positions xi and yi represent relative positions within the block MCU. In other words, a pixel of xi=yi=0 is the first corner pixel PXc1.

In the next Steps S530 and S535, the red-eye detecting module 410 determines whether the target pixel PXi is included in the eye area EA1. The position of the target pixel PXi in direction X is "Xm+xi", and the position of the target pixel PXi in direction Y is "Ym+yi". The determination process is performed based on these positions.

In Step S530, it is determined whether the following Condition P1 is satisfied.

Condition P1
"Ym+yi" is equal to or larger than b0, and "Ym+yi" is equal to or smaller than b1.

In Step S535, it is determined whether the following Condition P2 is satisfied.
Condition P2
"Xm+xi" is equal to or larger than a0, and "Xm+xi" is equal to or smaller than a1.

Condition P1 represents that the position of the target pixel PXi in direction Y is within the eye area EA1. Condition P2 represents that the position of the target pixel PXi in direction X is within the eye area EA1. When both Conditions P1 and P2 are satisfied, the target pixel PXi is included in the eye area EA1.

When both Conditions P1 and P2 are satisfied, the red-eye detecting module 410 performs color conversion for the pixel data of the target pixel PXi and stores the pixel data after the conversion in the buffer for the eye area EA1 in Step S540. This color conversion is the same as the process of Step S325 of FIG. 5.

Subsequently, the red-eye detecting module 410 increases the relative position xi by one (S545). When the relative position xi that has been increased is smaller than the block size M (S550: Yes), the process returns to Step S535. As described above, the red-eye detecting module 410 repeats Steps S535-S550 for all the relative positions xi within the target block MCUm. After the repetition for the relative positions xi is completed, the red-eye detecting module 410 increases the relative position yi by one (S555). When the relative position yi that has been increased is smaller than the block size M (S560: Yes), the process proceeds to Step S527. As described above, the red-eye detecting module 410 repeats Steps S527-S560 for all the relative positions yi within the target block MCUm. Here, when Condition P1 is not satisfied (S530: No), Steps S535-S550 are skipped. When Condition P2 is not satisfied (S535: No), Step S540 is skipped. As a result, the data of pixels, which are included in the eye area EA1, of all the pixels within the target block MCUm is stored in the buffer for the eye area EA1.

After the repetition for the pixels within the target block MCUm is completed, the red-eye detecting module 410 increases the position Xm by the block size M (S565). When the position Xm that has been increased is smaller than the width IW (S570: Yes), the process proceeds to Step S510. As described above, the red-eye detecting module 410 repeats Steps S510-S570 for the positions Xm of all the blocks MCU within the target image IMG. After the repetition for the position Xm is completed, the red-eye detecting module 410 increases the position Ym by the block size M (S575). When the position Ym that has been increased is smaller than the height IH (S580: Yes), the process proceeds to Step S505. As described above, the red-eye detecting module 410 repeats Steps S505-S580 for the positions Ym of all the blocks MCU within the target image IMG. Here, when Condition B1 is not satisfied (S515: No), Steps S520-S570 are skipped. When Condition B2 is not satisfied (5520: No), Steps S525-S560 are skipped.

As a result, the red-eye detecting module 410 acquires the image data of the eye area by selectively decoding the block MCU, which includes the pixel representing the eye area, among the plurality of block MCUs included in the target image IMG.

Figure 11:
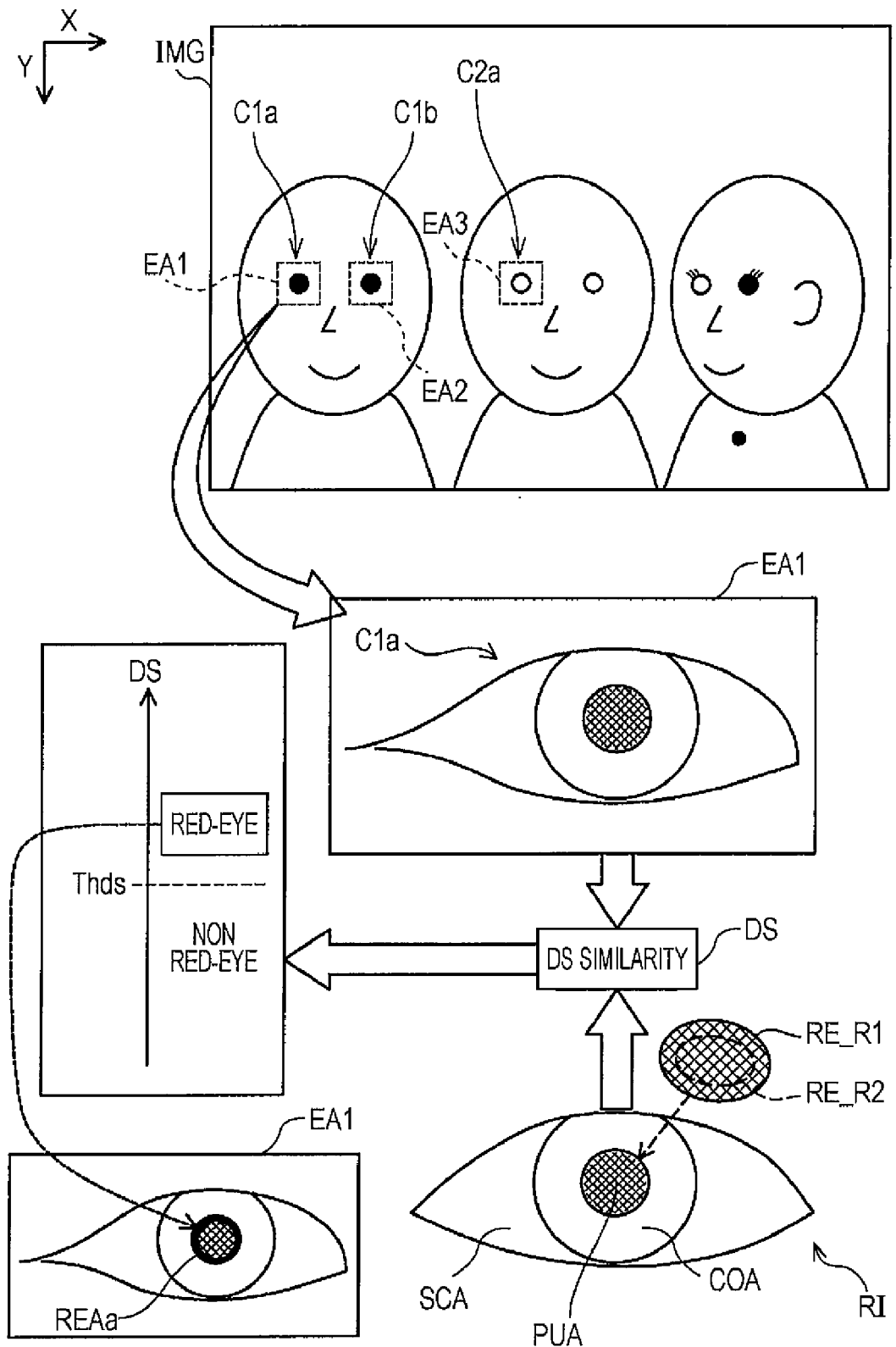
FIG. 11 is a schematic diagram showing a process for detecting a red-eye area from an eye area according to an embodiment of the invention.

After decoding the eye area is completed, the red-eye detecting module 410 detects a red-eye area from the eye area by using the decoded image data (eye area) in the next Step S135 of FIG. 4. FIG. 11 is a schematic diagram showing a process for detecting a red-eye area from the eye area. There are three differences between the processes of FIG. 11 and FIG. 7. The first difference is that a red-eye area is detected only from the eye area in the process of FIG. 11. The second difference is that a target image IMG (image data of the decoded eye area) is used instead of the reduced-size image LIMG in the process of FIG. 11. The third difference is that the first red-color range RE_R1 is used instead of the second red-dolor range RE_R2 (FIG. 8) in the process of FIG. 11. A method of detecting a red-eye area is the same as that shown in FIG. 7. As a result, when pixels representing a pupil include a pixel representing the color within the first red-color range RE_R1, a red-eye area is detected. In addition, as the similarity DS, a similarity between the candidate area within the eye area and the reference image RI is used. Here, the entire eye area may be used as the candidate area. In addition, as described above, the similarity DS is not dependent upon the pixel density that is used for calculating the similarity. Accordingly, a common similarity threshold value Thds can be used for a case where the target image IMG is used and a case where the reduced-size image LIMG is used.

In FIG. 11, detection of a red-eye area REAa from the first eye area EA1 is shown. Since a target image IMG having high pixel density is used instead of a reduced-size image for detecting a red-eye area from the eye area, more accurate detection of a red-eye area can be performed. In addition, since the first red color range RE_R1 that is broader than the second red-color range RE_R2 is used, a detection miss of a red-eye area can be suppressed.

As described above, the red-eye detecting module 410 detects a red-eye area from the eye area by using decoded image data (that is, the target image IMG). When a plurality of eye areas is detected, the processes of Steps S120-S135 of FIG. 4 are repeated for each eye area.

When the processes for all the eye areas are completed (S150: Yes), the image processing module 430 performs red-eye correction in the next Step S160. Red-eye correction is a process that is performed, so that a red-eye included in the target image is not easily recognized visually. According to this embodiment, a process for decreasing saturation of the red-eye area is performed as the red eye correction. Other processes may be used as-the red-eye correction process. For example, a process for decreasing saturation of the red-eye area and a process for decreasing brightness of the red-eye area can be used.

In the next Step S180, the print data generating module 440 generates print data by using the image data processed by the image processing module 430. Any format of the print data that is appropriate to the print engine 300 can be employed. For example, according to this embodiment, the print data generating module 440 generates print data that represents a recording state of ink dots by performing a resolution converting process, a color converting process, and a half-tone process. Then, the print data generating module 440 supplies the generated print data to the print engine 300. The print engine 300 performs a printing process based on the received print data. The process of FIG. 4 is then completed. In addition, the whole of the print data generating module 440 and the print engine 300 corresponds to a print unit according to an embodiment of the invention.

As described above, according to this embodiment, since the reduced-size image LIMG having low pixel density is used for detecting a red-eye area from an area outside the eye area (FIG. 7), the memory size needed for the process can be reduced. In addition, the process can be performed at a high speed. In addition, since a target image IMG having high pixel density is used for detecting a red-eye area from an area inside an eye area (FIG. 11), the accuracy of detection of a red-eye can be increased.

In addition, since a second red color range RE_R2 that is relatively narrow is used for detecting a red-eye area from an area outside the eye area (FIG. 7), erroneous detection of an area that represents not a red-eye but a subject (for example, the button C3c) as a red-eye area can be suppressed. In addition, since a first red color range RE_R1 that is relatively broad is used for detecting a red-eye area from an area inside an eye area (FIG. 11), a detection miss of a red-eye area can be suppressed.

As described above, since the process for detecting a red-eye is switched for an area inside the eye area and an area outside the eye area, a red-eye can be detected in consideration of the type of a subject that is represented by an image portion in which a red-eye is detected.

There is a low possibility that a red-eye exists outside an eye area. For an area outside an eye area, even when the reduced-size image LIMG having low pixel density is used, the detection accuracy of a red-eye area is not excessively decreased. In addition, even when a strict condition (the second red color range RE_R2) is employed, the detection accuracy is not excessively decreased. On the other hand, for an eye area in which there is a high possibility that a red-eye exists, a target image IMG having high pixel density is used, and the red-eye detection accuracy is thereby increased. In addition, by employing a mild condition (the first red color range RE_R1), a red-eye detection miss can be suppressed. The eye area according to this embodiment corresponds to an organ area.

Second Embodiment

Figure 12:
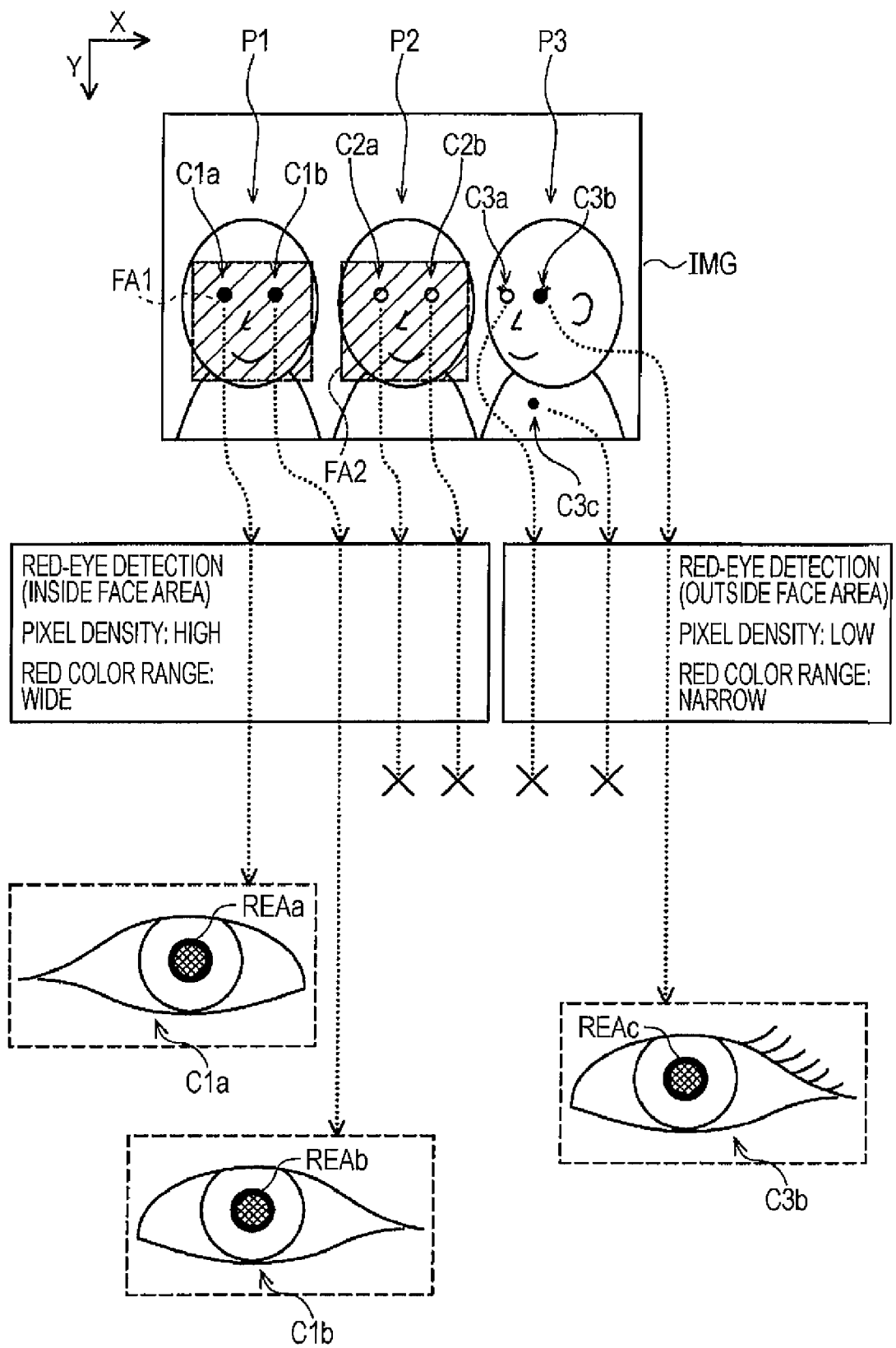
FIG. 12 is a schematic diagram showing a process for detecting a red-eye area according to a second embodiment of the invention.

FIG. 12 is a schematic diagram showing a process for detecting a red-eye area according to a second embodiment of the invention. The only difference between the first embodiment of FIG. 3 and the second embodiment is that a face area is used instead of an eye area in the second embodiment. As a face area, a rectangular area including images of eyes and a mouth of a person is used. Other configurations are the same as those of the first embodiment of FIG. 3. In addition, the sequence of the printing process is the same as that of the first embodiment of FIGS. 4, 5, and 9. The method of detecting a face area is the same as the method of detecting an eye area. In addition, the configuration of a printer is the same as that of the printer 100 according to the first embodiment of FIGS. 1 and 2.

In FIG. 12, the same target image IMG as in FIG. 3 is shown. In FIG. 12, the organ detecting module 400 detects a first face area FA1 that represents a face of a first person P1 and a second face area FA2 that represents a face of a second person P2. The red-eye detecting module 410 detects a red-eye area from the face areas FA1 and FA2 in accordance with the same process as that of FIG. 11. In FIG. 12, as in the first embodiment of FIG. 3, two red-eye areas REAa and REAb are detected from the face area FA1. In addition, the red-eye detecting module 410 detects a red-eye area from an area outside a face area in accordance with the same process as in FIG. 7. In FIG. 12, as in the first embodiment of FIG. 3, a red-eye area REAc is detected from the eye C3b.

As described above, an organ area is not limited to an eye area, and thus, a face area may be used as the organ area. In this case, there is a high possibility that a red eye exists in an area inside a face area, and there is a low possibility that a red eye exists in an area outside the face area. Accordingly, the process for detecting a red-eye is switched for an area inside a face area and an area outside a face area, and the same advantage as that of the first embodiment is thereby acquired.

Third Embodiment

Figure 13:
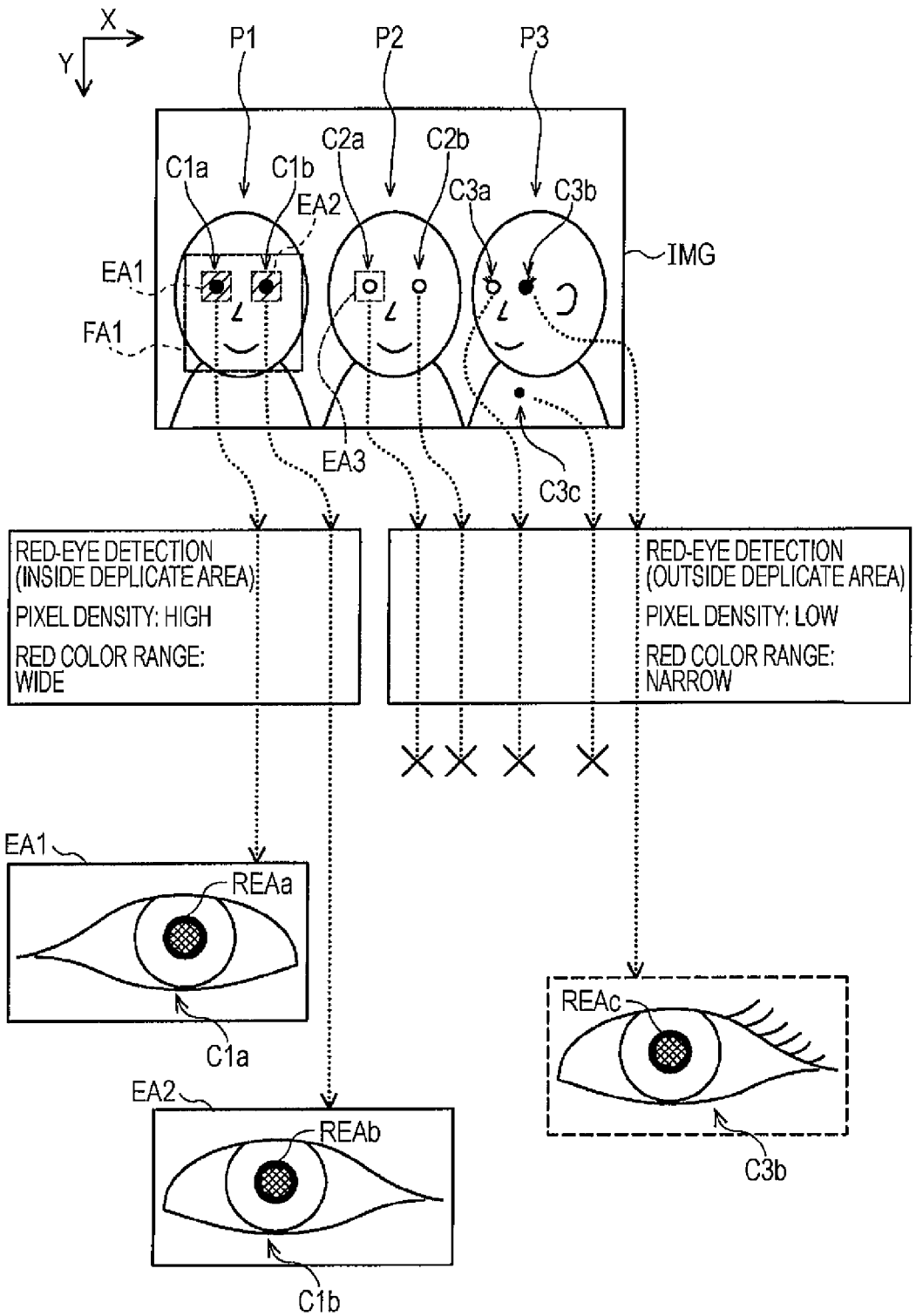
FIG. 13 is a schematic diagram showing a process for detecting a red-eye area according to a third embodiment of the invention.

FIG. 13 is a schematic diagram showing a process for detecting a red-eye area according to a third embodiment of the invention. The only difference between the first embodiment of FIG. 3 and the third embodiment is that, in the third embodiment, both a face area and an eye area are detected independently, and the eye area included in a face area is used as the organ area. Other configurations are the same as those of the first embodiment of FIG. 3. In addition, the sequence of a printing process is the same as that of the first embodiment of FIGS. 4, 5, and 9. The configuration of a printer is the same as that of the printer 100 according to the first embodiment of FIGS. 1 and 2.

In FIG. 13, the same target image IMG as that of FIG. 3 is shown. The organ detecting module 400 detects three eye areas EA1, EA2, and EA3, which is the same as in the first embodiment of FIG. 3. In addition, the organ detecting module 400 detects a first face area FA1 that represents a face of a first person P1 (in FIG. 13, face areas representing faces of the remaining persons P2 and P3 are not detected). Then, the organ detecting module 400 employs an eye area that is included in the face area as an organ area. In FIG. 13, two eye areas EA1 and EA2 that are included in the first face area FA1 are employed as organ areas. A third eye area EA3 that is not included in a face area is not employed as an organ area. Detection of an eye area and a face area are performed in the same manner as in the embodiments of FIGS. 3 and 12.

The red-eye detecting module 410 detects a red-eye area from the organ areas EA1 and EA2 in accordance with the same process as that of FIG. 11. In FIG. 13, as in the first embodiment of FIG. 3, a first red-eye area REAa is detected from the first eye area EA1, and a second red-eye area REAb is detected from the second eye area EA2. In addition, the red-eye detecting module 410 detects a red-eye area from an area outside the organ areas in accordance with the same process as that of FIG. 7. In FIG. 13, as in FIG. 3, a red-eye area REAc is detected from an eye C3b.

As described above, according to this embodiment, an eye area is used as the organ area. Accordingly, the same advantages as in the first embodiment are acquired. In addition, according to this embodiment, an eye area that is included in a face area is employed as an organ area. Accordingly, even when an image area that represents a subject other than an eye is erroneously detected as an eye area, the face area is not employed as an organ area in a case where the eye area is not included in a face area. As a result, red eye detection accuracy is improved.

Fourth Embodiment

Figure 14:
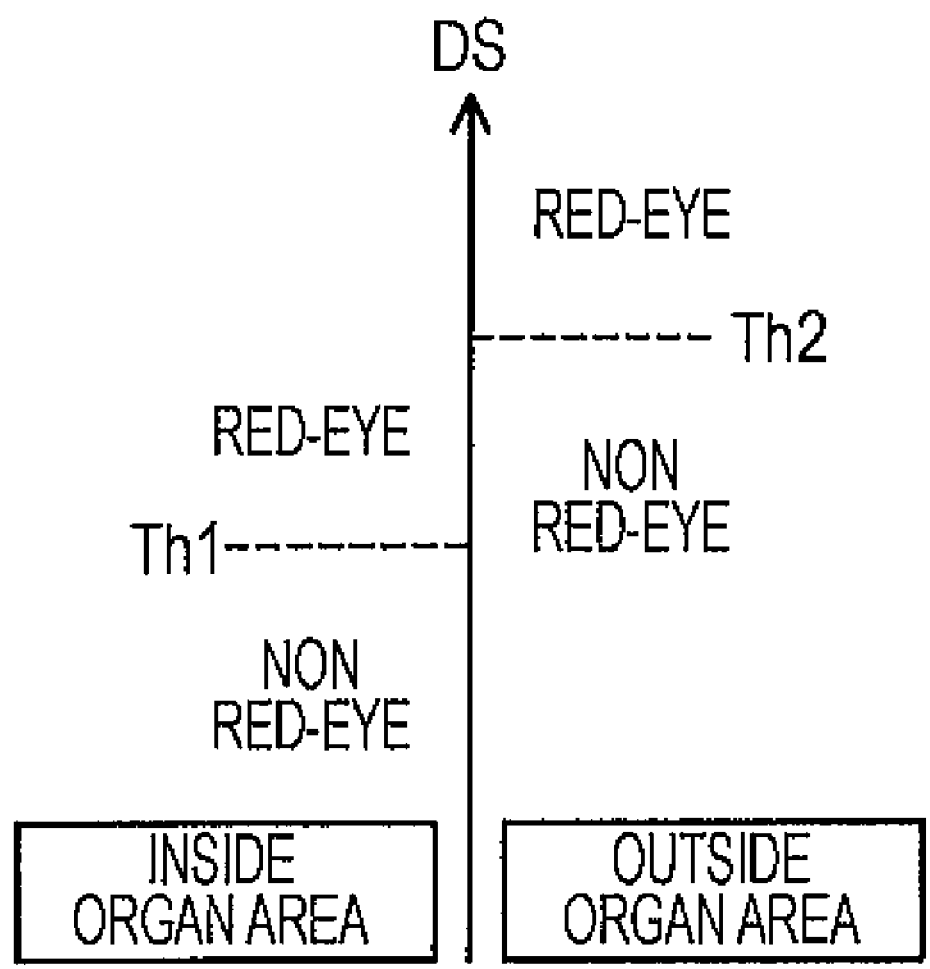
FIG. 14 is a schematic diagram showing a process for detecting a red-eye area according to a fourth embodiment of the invention.

FIG. 14 is a schematic diagram showing a process for detecting a red-eye area according to a fourth embodiment of the invention. The only difference between the above-described embodiments and the fourth embodiment is that, in the fourth embodiment, a threshold value of similarity DS differs for an area inside an organ area and an area outside an organ area. Otherwise, the configuration of the embodiments of FIGS. 3, 12, and 13 may be employed. In addition, the printing process is the same as that in FIGS. 4, 5, and 9, and the printer configuration is the same as that of the printer 100 of FIGS. 1 and 2.

For an area inside an organ area, a first threshold value Th1 that is relatively small is used. Accordingly, a detection miss for a red eye from an area inside an organ area (an area in which there is high possibility that a red eye exists) is suppressed. On the other hand, for an area outside an organ area, a second threshold value Th2 that is larger than the first threshold value Th1 is used. Accordingly, erroneous detection of an area representing a subject other than a red eye as a red-eye area from an area outside an organ area (an area in which there is low possibility that a red eye exists) is suppressed.

A sum value of differences of pixel values that are used for calculating the similarity DS and a threshold value may be configured to be compared with each other. In other words, when the sum value is smaller than the threshold value, the red-eye detecting module 410 may be configured to determine that a focused image area represents a red eye. In such a case, a small sum value of the differences of the pixel values represents high similarity. Accordingly, when the sum value is smaller than the threshold value, the similarity is higher than the threshold value. Thus, a similarity that is higher than the threshold value can be regarded as a condition for detecting a red-eye area. As described above, various values that represent the degree of similarity between two images can be used to determine the condition of "the similarity is higher than the threshold value". When a value representing the degree of similarity is within a range representing that the degree of similarity is higher than the threshold value (that is, two images are similar), the red-eye detecting module 410 can determine that a focused image area represents a red eye.

In addition, according to this embodiment, the range of red color that is used for detecting a red eye area may be the same for areas inside and outside an organ area. However, as in the embodiment of FIG. 8, the range of red color for an area inside an organ area is preferably broader than that for an area outside an organ area.

MODIFIED EXAMPLES

Among the constituent elements of the above-described embodiments, elements other than those claimed in the following claims are additional elements and may be appropriately omitted. The invention is not limited to the above-described embodiments or examples, which may be modified without departing from the gist of the invention. For example, the following modifications can be made.

Modified Example 1

In the above-described embodiments, various areas including an image of a person's eye may be used as the organ area. For example, an area that does not include an image of a mouth but includes an image of an eye and an image of a nose may be used as the organ area. In any case, the organ detecting module 400 preferably detects an area including an image of an eye as the organ area, regardless whether the image of the eye represents a red eye. Here, the organ detecting module 400 may be configured to detect an organ area from the target image IMG instead of the reduced-size image LIMG. In such a case, the red-eye detecting module 410 may be configured to generate a reduced-size image LIMG. In any case, it is preferable that the red-eye detecting module 410 selectively decodes a block MCU (FIG. 10) that includes a pixel representing an organ area.

In addition, in the above-described embodiments, various areas including an image of a red-eye may be used as the red-eye area. For example, in addition to a pupil shown in red, an area including a cornea positioned in the periphery thereof may be detected as the red-eye area.

Modified Example 2

In the above-described embodiments, the red-eye detecting module 410 may be configured to use images of a same pixel density for areas inside and outside the organ area. In addition, conditions used for detecting the red-eye area may be the same for areas inside and outside the organ area. However, at least one side between the pixel densities and the conditions is preferably different for areas inside and outside the organ area.

Modified Example 3

In the above-described embodiments, a process using the result of detection of the red-eye area is not limited to red-eye correction, and other processes may be used. For example, the image processing module 430 may select the remaining image acquired by excluding an image in which a red-eye area is detected from among a plurality of images. The selected image may be used for any purpose. For example, the selected image may be used for a printing process or may be copied to a predetermined folder.

Modified Example 4

In the above-described embodiments, the target image data is not limited to JPEG image data, and other types of image data may be used. For example, image data such as TIFF image data that is not encoded for each block may be used. In addition, the target image data is not limited to still image data. Moving picture data may be used as the target image data. In such a case, at least a part of a plurality of frame images that are included in a moving picture may be used as the target image.

In addition, in the above-described embodiments, as the pixel density (that is, the number of pixels) of the reduced-size image, any density that is lower than the pixel density of the original target image may be used (the pixel density is preferably experimentally determined in advance so as to detect a red-eye area). In addition, while the aspect ratio of the reduced-size image is preferably the same as that of the target image, the aspect ratio may be configured to be changed.

Modified Example 5

In the above-described embodiments, an image process and a printing process for the entire target image may be performed by repeating the image processing, generation of print data, and a printing process for the print data in units of a part of lines (for example, one line or two lines) of the target image. In such a case, a large volume of data is not stored in the memory, and accordingly, the amount of the memory is saved.

Modified Example 6

In the above-described embodiments, the use of the image data for which the image processing is completed is not limited to printing the image data, and other uses may be employed. For example, the image processing module 430 may generate an image file in which the processing-completed image data is stored. The image processing module 430 may provide the generated image file to a user in any arbitrary manner. For example, the image file may be stored in a memory card MC (FIG. 1). Here, the print data generating module 440 may be omitted. In addition, the image processing module 430 may be omitted. In such a case, the red-eye detecting module 410 may supply the target image data and information representing a red eye area to another image processing apparatus.

Modified Example 7

In the above-described embodiments, a method of detecting an area including an image of a person's organ (for example, an eye or a face) from an image (for example, a target image or a reduced-size image) is not limited to a method using pattern matching, and other methods may be used. For example, a boosting method (for example, AdaBoost), a support vector machine, or a neural network may be used. In any case, the red-eye detecting module 410 is preferably configured to detect an area satisfying a relatively mild condition from an area inside the organ area as a red-eye area and to detect an area satisfying a relatively strict condition from an area outside the organ area as a red-eye area. In addition, the red-eye detecting module 410 preferably uses an image having relatively high pixel density for an area inside the organ area and an image having relatively low pixel density for an area outside the organ area.

Modified Example 8

In the above-described embodiments, the image processing apparatus that detects a red-eye area from a target image is not limited to the printer 100 (FIG. 1), and another processing apparatus may be used. For example, a multi-function apparatus that performs a printing process and an optical scanning process, a digital still camera, or a general-purpose computer may be used.

Modified Example 9

In the above-described embodiments, a part of the configuration that is implemented by hardware may be replaced by software, and a part or the whole of the configuration that is implemented by software may be replaced by hardware. For example, the function of the organ detecting module 400 of FIG. 2 may be implemented by a hardware circuit having a logic circuit.

When a part or the whole of the function of an embodiment of the invention is implemented by software (a computer program), the software may be stored in a computer-readable recording medium. A "computer-readable recording medium" according to the invention is not limited to a portable recording medium such as a flexible disk or a CD-ROM, and includes internal memory devices such as various types of RAM or ROM that are installed inside the computer, and external memory devices such as a hard disk that are fixed to the computer.

What is claimed is:

1. An image processing apparatus comprising:
   an organ detecting unit that detects an organ area including an image of an eye in a target image; and
   a red-eye detecting unit that detects a red-eye area including an image of a red eye by using the organ area, wherein
   the red-eye detecting unit detects the red-eye area in accordance with a first detection process from the organ area and detects the red-eye area in accordance with a second detection process that is different from the first detection process from a remaining area acquired by excluding the organ area from the target image,
   the first detection process detects an area satisfying a first condition as the red-eye area,
   the second detection process detects an area satisfying a second condition, which is more difficult to satisfy than the first condition, as the red-eye area,
   the first condition includes that pixels representing a pupil within an area to be detected as the red-eye area include a pixel that represents a color in a first red-color range, and the second condition includes that the pixels representing the pupil include a pixel that represents a color in the first red-color range and represents a color in a second red-color range that is narrower than the first red-color range.

2. The image processing apparatus according to claim 1, wherein
the first detection process detects the red-eye area by using an image that represents the organ area and has relatively high pixel density, and
the second detection process detects the red-eye area by using an image that represents the remaining area and has relatively low pixel density.

3. The image processing apparatus according to claim 1, further comprising an image processing unit that performs red-eye correction by using the detected red-eye area.

4. An image processing apparatus comprising:
an organ detecting unit that detects an organ area including an image of an eye in a target image; and
a red-eye detecting unit that detects a red-eve area including an image of a red eye by using the organ area, wherein
the red-eye detecting unit detects the red-eye area in accordance with a first detection process from the organ area and detects the red-eve area in accordance with a second detection process that is different from the first detection process from a remaining area acquired by excluding the organ area from the target image,
the first detection process detects an area satisfying a first condition as the red-eye area,
the second detection process detects an area satisfying a second condition, which is more difficult to satisfy than the first condition, as the red-eye area,
the first condition includes that a similarity between a candidate area including an area to be detected as the red-eye area and a predetermined reference image representing a red eye is higher than a first threshold value, and
the second condition includes that the similarity is higher than a second threshold value that is larger than the first threshold value.

5. A printer comprising:
an organ detecting unit that detects an organ area including an image of an eye in a target image;
a red-eye detecting unit that detects a red-eye area including an image of a red eye by using the organ area;
an image processing unit that performs red-eye correction by using the detected red-eye area; and
a printing unit that prints the target image processed by the image processing unit, wherein
the red-eye detecting unit detects the red-eye area in accordance with a first detection process from the organ area and detects the red-eye area in accordance with a second detection process that is different from the first detection process from a remaining area acquired by excluding the organ area from the target image,
the first detection process detects an area satisfying a first condition as the red-eye area,
the second detection process detects an area satisfying a second condition, which is more difficult to satisfy than the first condition, as the red-eye area,
the first condition includes that pixels representing a pupil within an area to be detected as the red-eye area include a pixel that represents a color in a first red-color range, and
the second condition includes that the pixels representing the pupil include a pixel that represents a color in the first red-color range and represents a color in a second red-color range that is narrower than the first red-color range.

6. An image processing method comprising:
detecting an organ area including an image of an eye in a target image; and
detecting a red-eye area including an image of a red eye by using the organ area,
wherein the detecting of the red-eye area includes:
detecting the red-eye area in accordance with a first detection process from the organ area; and
detecting the red-eye area in accordance with a second detection process that is different from the first detection process from a remaining area acquired by excluding the organ area from the target image, wherein
the first detection process detects an area satisfying a first condition as the red-eye area,
the second detection process detects an area satisfying a second condition, which is more difficult to satisfy than the first condition, as the red-eye area,
the first condition includes that pixels representing a pupil within an area to be detected as the red-eye area include a pixel that represents a color in a first red-color range, and
the second condition includes that the pixels representing the pupil include a pixel that represents a color in the first red-color range and represents a color in a second red-color range that is narrower than the first red-color range.

* * * * *